United States Patent [19]
Hogg

[11] 3,946,787
[45] Mar. 30, 1976

[54] APPARATUS FOR USE IN REMOVING TIRES FROM AND MOUNTING TIRES ON WHEEL RIMS

[75] Inventor: Derek Hogg, Sutton Coldfield, England

[73] Assignee: Dunlop Limited, London, England

[22] Filed: Nov. 18, 1974

[21] Appl. No.: 524,748

Related U.S. Application Data

[63] Continuation of Ser. No. 251,084, May 8, 1972, abandoned.

[30] Foreign Application Priority Data

May 12, 1971 United Kingdom............... 14605/71

[52] U.S. Cl. ............................................. 157/1.24
[51] Int. Cl.² ..................................... B60C 25/08
[58] Field of Search.................. 157/1.24, 1.1, 1.17; 144/288 A

[56] References Cited
UNITED STATES PATENTS
2,556,024    6/1951    Bourdon et al.................... 157/1.24

FOREIGN PATENTS OR APPLICATIONS
1,208,824    2/1960    France............................... 157/1.24

*Primary Examiner*—Al Lawrence Smith
*Assistant Examiner*—James G. Smith
*Attorney, Agent, or Firm*—Stevens, Davis, Miller & Mosher

[57] ABSTRACT

Apparatus for use in mounting tires on and removing tires from wheel rims including wheel supporting means comprising a plurality of gripping arms and claws, each claw being provided with an extension block for supporting the adjacent bead and lower sidewall of the tire on the wheel rim clear of its bead seat on the rim. The extension block may be detachable from each claw, or pivotally secured to it and held in an operative position by self locking means.

9 Claims, 6 Drawing Figures

APPARATUS FOR USE IN REMOVING TIRES FROM AND MOUNTING TIRES ON WHEEL RIMS

This is a continuation, of application Ser. No. 251,084, filed May 8, 1972, now abandoned.

This invention relates to apparatus for use in removing tires from and mounting tires on wheel rims. In particular it relates to apparatus comprising a supporting means on which a wheel rim is gripped and rotated about its axis while a stationary tool engages with a tire to remove the tire from or mount it on a wheel rim.

In accordance with the invention apparatus for use in removing tires from and mounting tires on wheel rims includes a supporting means for a wheel rim comprising gripping means for gripping a wheel rim flange, which gripping means comprises a plurality of arms each arm being provided with a claw for engaging said rim flange and means for supporting the adjacent bead and lower sidewall of a tire on the wheel rim clear of its bead seat on the rim when the rim is engaged by said gripping means.

Preferably the means for supporting the adjacent bead and lower sidewall of the tire comprises extension blocks each integrally formed with or secured to the claws, one block to a claw.

Two alternative embodiments of the invention will now be described by way of example, with reference to the accompanying drawings of which:

As described in our co-pending application U.S. Pat. No. 3,818,968 of June 25, 1974 filed on May 12, 1971 a wheel supporting means for supporting a wheel comprises three arms disposed in a single plane, each arm having on its outer end a wheel rim gripping claw for gripping the lower rim flange of a wheel supported on the supporting means. The arms can be moved inwards or outwards so that the claws can move into or out of engagement with the flange.

Figure 6:
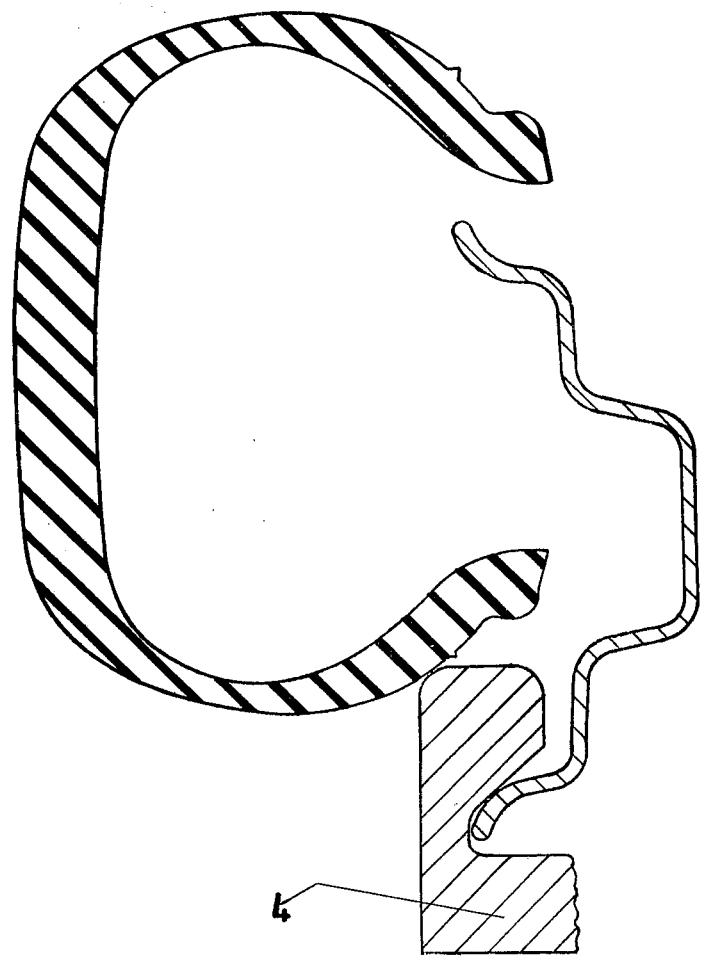
FIG. 6 is a sectional view through a tire and its wheel rim showing an extension block in its operative position supporting [the whole of] the bead a distance from the rim flange sufficient to ensure that while the tire is being removed from the wheel rim that no part of the lower tire bead falls back into engagement with its bead seat.

In each embodiment each claw is formed so as to extend from below the plane formed by the axially outer edge of a rim into the space between the two wheel rim flanges and, in particular, into that region normally occupied by the lower bead region of a tire when the tire is located in seating engagement with the tire bead seat and on the axially inner surface of the wheel rim flange. Each claw is provided with an extension in the form of a block which, when the claw is gripping the rim flange, engages with the tire bead region and lower sidewall to hold the whole of the tire bead away from its bead seat. The height of the extension on the lower wheel rim flange, i.e. the distance a portion of the tire bead is held from the flange, is at least sufficient to ensure that while the tire is being removed from the wheel no part of the lower tire bead falls back into engagement with its bead seat. This greatly facilitates the removal operation as is illustrated in FIG. 6 where one extension is shown by way of example holding, in conjunction with the other similar extensions which are not shown, the whole of the tire bead away from its bead seat.

Figure 1:
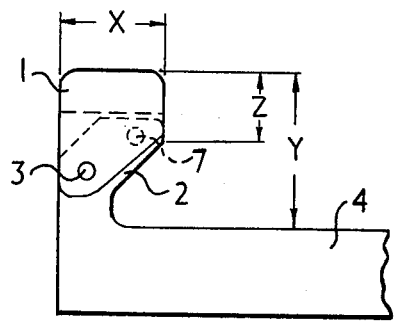
FIG. 1 shows a fragmentary side view of the claw and arm end of the first embodiment, the extension block being in its operable position.
Figure 2:
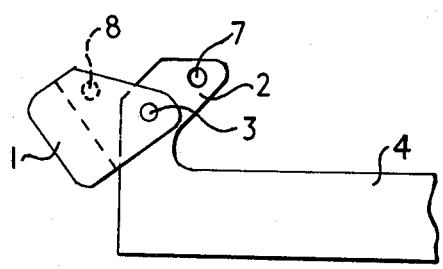
FIG. 2 shows a fragmentary side view of the claw and arm end of the first embodiment, the extension block being in its inoperable position.
Figure 3:
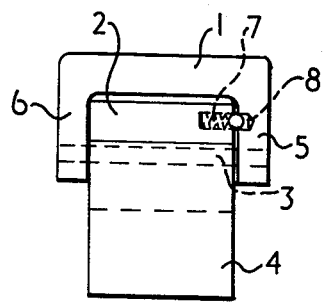
FIG. 3 shows an end elevation of the claw and arm end shown in FIG. 1.

In the first embodiment illustrated in FIGS. 1–3 the extension blocks 1 are each secured to their respective claw 2 by means of a pivot shaft 3 extending through the claw at right angles to the length of the arm 4 on which the claw is located into two side members 6 of the extension block which are located one at each side of the claw 2. Self-locking means comprising a ball-catch 7 located on one side of the claw, the ball 9 of the ball-catch being engageable in a depression 8 in one side member 5 of the extension block 1, are provided on each claw 2 allowing the extension blocks to be used with the blocks held in an operative position as shown in FIGS. 1 and 3 or withdrawn to an inoperative position as shown in FIG. 2, depending on the rim/tire fitment. This embodiment allows for part, e.g. half, of the preferred extension height to be built into the claw, the remainder on the pivoted block which is suitably positioned and dimensioned e.g. for wide rims.

Figure 4:
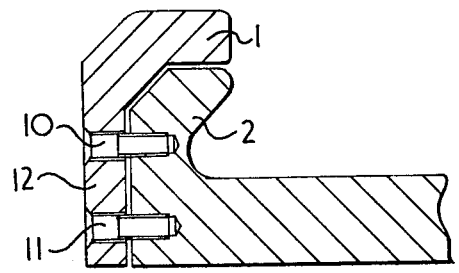
FIGS. 4 and 5 show fragmentary side views of a claw and arm end of the second embodiment, two different sizes of extension block being shown.
Figure 5:
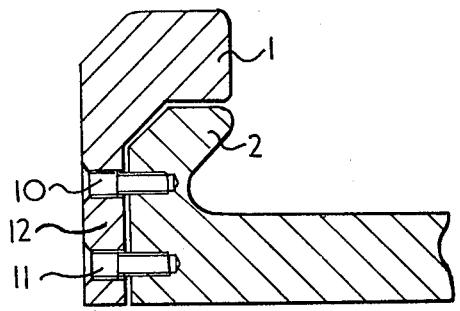

In the second embodiment shown in FIGS. 4 and 5 the blocks 1 are completely detachable from the claws 2 by means of screws 10, 11 and a range of blocks of different dimensions each suitable for a particular size wheel/or tire is provided.

The blocks may be of the same shape as illustrated in FIGS. 1, 2 and 3 i.e., having two side members, or as shown in FIGS. 4 and 5 with one limb 12 provided with screw holes.

Two different sizes of extension blocks are shown, one in each of FIGS. 4 and 5.

However, under the conditions which usually exist in tire fitting and removal workshops detachable blocks would be liable to become lost or damaged and for this reason it is advantageous to make the block/claw of a single size suitable for a range of wheel sizes and not readily detachable from the claw for example, as shown in FIG. 6.

The dimensions of an integral block/claw in accordance with the invention found to be most suitable for wheels having 10 inch to 17 inch rims are X = 26 mm, Y = 37 mm, Z = 18 mm, the dimensions X, Y and Z being indicated in FIG. 1.

Having now described my invention, what I claim is:

1. Apparatus for use in removing tires from and mounting tires on wheel rims including a wheel supporting means for a wheel rim comprising gripping means for gripping a wheel rim flange, said gripping means having a plurality of arms, each arm having a claw for engaging said rim flange and extension block means projecting outwardly above said claw for engaging at least part of the adjacent bead and lower sidewall of a tire on a wheel rim, and supporting the whole of the adjacent bead a distance from the flange sufficient to ensure that while the tire is being removed from the wheel no part of the lower tire bead falls back into engagement with its bead seat when the rim is engaged by said gripping means.

2. The apparatus of claim 1 in which each extension block means is integrally formed with its respective claw.

3. The apparatus of claim 1 in which the block means are secured to the claws, one block to a claw.

4. The apparatus of claim 3 in which the blocks are detachably secured to the claws.

5. The apparatus of claim 4 including screws for detachably securing the blocks to the claws.

6. The apparatus of claim 3 in which the blocks are pivotally secured to the claws.

7. The apparatus of claim 6 including self-locking means for holding the blocks in an operating position.

8. The apparatus of claim 7 in which a depression is formed in each extension block and the self-locking means comprises spring loaded ball catches, one on each claw, each ball being engageable in a depression.

9. Apparatus for removing tires from and mounting tires on wheel rims including a wheel supporting means for a wheel rim comprising gripping means for gripping a wheel rim flange, such gripping means having a plurality of arms, each arm having a claw for engaging said rim flange and extension block means pivotally attached to each claw and moveable from a first position where said extension block means projects outwardly above its respective claw for engaging the adjacent bead and lower sidewall of a tire on the wheel rim to a second inoperative position where it will not so engage such tire.

* * * * *